(12) United States Patent
Bousfield (10) Patent No.: US 12,345,359 B2
(45) Date of Patent: Jul. 1, 2025

(54) TUBE COUPLING

(71) Applicant: Rain Bird Corporation, Azusa, CA (US)

(72) Inventor: Randall Dennis Bousfield, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 17/964,741

(22) Filed: Oct. 12, 2022

(65) Prior Publication Data

US 2024/0125416 A1    Apr. 18, 2024

(51) Int. Cl.
*F16L 33/22*    (2006.01)
*F16L 33/32*    (2006.01)

(52) U.S. Cl.
CPC ............. *F16L 33/227* (2013.01); *F16L 33/32* (2013.01)

(58) Field of Classification Search
CPC ......... F16L 33/227; F16L 33/22; F16L 31/00; F16L 33/32
See application file for complete search history.

(56) References Cited

U.S. PATENT DOCUMENTS

| | | |
|---|---|---|
| 365,387 A | 6/1887 | Klein |
| 2,187,217 A | 1/1940 | Winslow |
| 2,201,372 A | 5/1940 | Miller |
| 2,570,224 A | 10/1951 | Fason |
| 2,967,067 A | 1/1961 | Singer |
| 2,975,799 A | 3/1961 | Stilwell |
| 3,027,179 A | 3/1962 | Wiltse |
| 3,384,392 A | 5/1968 | Gilchrist |
| 3,462,175 A | 8/1969 | Johnson |
| 3,633,944 A | 1/1972 | Hamburg |
| 3,731,955 A | 5/1973 | Borsum |
| 3,837,687 A | 9/1974 | Leonard |
| 3,874,709 A | 4/1975 | Macdonald |
| 3,924,877 A | 12/1975 | Leopold, Jr. |

(Continued)

FOREIGN PATENT DOCUMENTS

| | | | |
|---|---|---|---|
| CN | 101761719 A | 6/2010 | |
| CN | 107956942 A | * 4/2018 | .............. F16L 33/32 |

(Continued)

OTHER PUBLICATIONS

Hydro-Rain, Pictures of PVC Lock Fitting, publicly available before Jan. 16, 2018 (1 page).

(Continued)

*Primary Examiner* — Lanna Mai
*Assistant Examiner* — Fannie Kee
(74) *Attorney, Agent, or Firm* — Fitch, Even, Tabin & Flannery, LLP (57) ABSTRACT

A tube connector having a body and a coupler is provided. The body defines a fluid flow path therethrough. The coupler has an annular body including an outer wall and an inner surface. An end of the outer wall is mounted on the body at one end of the flow path. The inner surface is supported by the outer wall and defines a central opening for receiving an end portion of a tube. The coupler includes a barb protruding radially inward from the inner surface to engage the end portion of the tube to secure the tube to the coupler. The coupler includes a protrusion extending radially outward from the outer wall.

22 Claims, 8 Drawing Sheets

(56) References Cited

U.S. PATENT DOCUMENTS

| | | |
|---|---|---|
| 3,924,882 A | 12/1975 | Ellis |
| 3,963,268 A | 6/1976 | Widdicombe |
| 4,035,002 A | 7/1977 | Curtin |
| 4,047,739 A | 9/1977 | Aitken |
| 4,073,514 A | 2/1978 | Pate |
| 4,079,966 A | 3/1978 | Berry |
| 4,082,326 A | 4/1978 | Bryson |
| 4,146,254 A | 3/1979 | Turner |
| 4,214,586 A | 7/1980 | Mericle |
| 4,220,359 A | 9/1980 | Evenson |
| 4,303,263 A | 12/1981 | Legris |
| 4,304,424 A | 12/1981 | Hansen |
| 4,326,737 A | 4/1982 | Lehmann |
| 4,431,216 A | 2/1984 | Legris |
| 4,508,369 A | 4/1985 | Mode |
| 4,521,037 A | 6/1985 | Knox |
| 4,537,183 A | 8/1985 | Fogarty |
| 4,593,943 A | 6/1986 | Hama |
| 4,621,842 A | 11/1986 | Kowal |
| 4,627,644 A | 12/1986 | Ekman |
| 4,630,848 A | 12/1986 | Twist |
| 4,657,286 A | 4/1987 | Guest |
| 4,660,803 A | 4/1987 | Johnston |
| 4,676,533 A | 6/1987 | Gerondale |
| 4,685,706 A | 8/1987 | Kowal |
| 4,697,831 A | 10/1987 | Thalmann |
| 4,722,560 A | 2/1988 | Guest |
| 4,786,089 A | 11/1988 | McConnell |
| 4,801,158 A | 1/1989 | Gomi |
| 4,804,213 A | 2/1989 | Guest |
| 4,919,457 A | 4/1990 | Moretti |
| 4,946,205 A | 8/1990 | Washizu |
| 4,946,213 A | 8/1990 | Guest |
| 5,037,144 A | 8/1991 | Peting |
| 5,160,175 A | 11/1992 | Yang |
| 5,176,409 A | 1/1993 | Brooks |
| 5,230,539 A | 7/1993 | Olson |
| 5,286,066 A | 2/1994 | Yang |
| 5,316,350 A | 5/1994 | Kollenbrandt |
| 5,320,326 A | 6/1994 | Ju |
| 5,332,269 A | 7/1994 | Homm |
| 5,476,291 A | 12/1995 | Reneau |
| 5,586,791 A | 12/1996 | Kirchner |
| 5,683,120 A | 11/1997 | Brock |
| 5,695,224 A | 12/1997 | Grenier |
| 5,709,415 A | 1/1998 | Witter |
| 5,775,742 A | 7/1998 | Guest |
| 5,779,284 A | 7/1998 | Guest |
| 5,799,984 A | 9/1998 | Reynolds, Jr. |
| 5,806,898 A | 9/1998 | Hollnagle |
| 5,921,588 A | 7/1999 | Vogel |
| 6,027,125 A | 2/2000 | Guest |
| 6,183,022 B1 | 2/2001 | Guest |
| 6,231,090 B1 | 5/2001 | Fukao |
| 6,302,451 B1 | 10/2001 | Olson |
| 6,334,634 B1 | 1/2002 | Osterkil |
| 6,464,266 B1 | 10/2002 | O'Neill |
| 6,499,771 B1 | 12/2002 | Snyder, Sr |
| 6,517,124 B1 | 2/2003 | Le Quere |
| 6,616,193 B2 | 9/2003 | Anderson |
| 6,641,177 B1 | 11/2003 | Pinciaro |
| 6,685,230 B1 | 2/2004 | Bottura |
| 6,722,702 B1 | 4/2004 | Min-Cheol |
| 6,733,046 B1 | 5/2004 | Rief |
| 6,877,777 B1 | 4/2005 | Wartluft |
| 6,880,865 B2 | 4/2005 | Guest |
| 6,893,050 B2 | 5/2005 | Schiemann |
| 6,913,292 B2 | 7/2005 | Snyder, Sr. |
| 6,929,289 B1 * | 8/2005 | Guest ............... F16L 33/227 285/309 |
| 6,988,747 B2 | 1/2006 | Allen |
| 7,014,225 B1 | 3/2006 | Goodsel |
| 7,021,672 B2 | 4/2006 | Ericksen |
| 7,093,862 B2 | 8/2006 | Muto |
| 7,100,948 B2 | 9/2006 | Guest |
| 7,121,593 B2 | 10/2006 | Snyder, Sr. |
| 7,195,287 B2 | 3/2007 | Wai |
| 7,201,382 B2 | 4/2007 | Viegener |
| 7,249,788 B2 | 7/2007 | Muhammad |
| 7,328,493 B2 | 2/2008 | Jones |
| 7,331,613 B2 | 2/2008 | Schulte |
| 7,410,193 B2 | 8/2008 | Guest |
| 7,445,247 B2 | 11/2008 | Ericksen |
| 7,478,840 B2 | 1/2009 | Youssefifar |
| 7,488,008 B2 | 2/2009 | Hawkins |
| 7,500,699 B2 | 3/2009 | Snyder, Sr. |
| 7,506,899 B2 | 3/2009 | Feith |
| 7,621,569 B2 | 11/2009 | Anthoine |
| 7,686,346 B1 | 3/2010 | Buccicone |
| 7,815,225 B2 | 10/2010 | Jones |
| 7,841,630 B1 | 11/2010 | Auray |
| 7,862,089 B2 | 1/2011 | Crompton |
| 7,866,710 B2 | 1/2011 | Sheppard |
| 7,954,861 B2 | 6/2011 | Swift |
| 7,984,931 B2 | 7/2011 | Kertesz |
| 8,025,318 B2 | 9/2011 | Morroney |
| 8,205,915 B1 | 6/2012 | Crompton |
| 8,210,576 B2 | 7/2012 | Crompton |
| 8,235,427 B2 | 8/2012 | Jones |
| 8,274,000 B2 | 9/2012 | Smith |
| 8,398,122 B2 | 3/2013 | Crompton |
| 8,474,877 B2 | 7/2013 | Smith |
| 8,480,134 B2 | 7/2013 | Crompton |
| 8,487,197 B2 | 7/2013 | Smith |
| 8,608,205 B2 | 12/2013 | Lai |
| 8,628,117 B1 | 1/2014 | Cheng |
| 8,727,382 B2 | 5/2014 | Adrian |
| 8,844,981 B1 | 9/2014 | Crompton |
| 8,894,100 B2 | 11/2014 | Eaton |
| 8,898,876 B2 | 12/2014 | Feith |
| 9,022,432 B2 | 5/2015 | Firestine |
| 9,068,680 B1 | 6/2015 | Crompton |
| 9,217,529 B2 | 12/2015 | Crompton |
| 9,322,496 B1 | 4/2016 | Crompton |
| 9,429,262 B2 | 8/2016 | Ericksen |
| 9,562,637 B1 | 2/2017 | Crompton |
| 9,604,404 B2 | 3/2017 | Ericksen |
| 9,784,393 B2 | 10/2017 | Taylor |
| 9,816,656 B2 | 11/2017 | Crompton |
| 10,213,591 B2 | 2/2019 | Thomas |
| 10,844,988 B2 | 11/2020 | Simon |
| 10,962,157 B2 | 3/2021 | Jacobs |
| 11,060,646 B2 | 7/2021 | Jacobs |
| 11,060,652 B2 | 7/2021 | Belen |
| 11,333,280 B2 | 5/2022 | Firmian |
| 11,402,046 B2 | 8/2022 | Kimura |
| 11,460,133 B2 | 10/2022 | Kuo |
| 11,460,134 B2 | 10/2022 | Simon |
| 11,466,802 B2 | 10/2022 | Lawrence |
| 11,493,159 B2 | 11/2022 | Taylor |
| 11,506,316 B2 | 11/2022 | Simon |
| 11,512,802 B2 | 11/2022 | Schaaf |
| 11,519,532 B2 | 12/2022 | Lee |
| 2002/0038953 A1 | 4/2002 | McNab |
| 2002/0135184 A1 | 9/2002 | Snyder |
| 2004/0240940 A1 | 12/2004 | Ericksen |
| 2005/0194785 A1 | 9/2005 | Shemtov |
| 2008/0149873 A1 | 6/2008 | Cimberio |
| 2008/0157524 A1 | 7/2008 | Jones |
| 2009/0001712 A1 | 1/2009 | Webb |
| 2010/0045032 A1 | 2/2010 | Rea |
| 2010/0078937 A1 | 4/2010 | Jones |
| 2011/0138605 A1 | 6/2011 | Swift |
| 2011/0309611 A1 | 12/2011 | Smith |
| 2012/0024409 A1 | 2/2012 | Kunzmann |
| 2012/0074695 A1 | 3/2012 | Salehi-Bakhtiari |
| 2012/0161436 A1 | 6/2012 | Salehi-Bakhtiari |
| 2012/0200081 A1 | 8/2012 | Reznar |
| 2015/0345683 A1 | 12/2015 | Crompton |
| 2016/0040812 A1 | 2/2016 | Lai |
| 2016/0327196 A1 | 11/2016 | Gledhill |
| 2017/0009917 A1 | 1/2017 | Wust |
| 2017/0102102 A1 | 4/2017 | Goble |
| 2017/0198842 A1 | 7/2017 | Ericksen |

(56) References Cited

U.S. PATENT DOCUMENTS

| | | |
|---|---|---|
| 2018/0363815 A1 | 12/2018 | Jacobs |
| 2021/0156502 A1 | 5/2021 | Belen |
| 2021/0207750 A1 | 7/2021 | Jacobs |
| 2021/0388933 A1 | 12/2021 | Belen |
| 2022/0316639 A1 | 10/2022 | Kimura |
| 2024/0049659 A1 | 2/2024 | Lutzky |

FOREIGN PATENT DOCUMENTS

| | | | |
|---|---|---|---|
| DE | 10249958 B3 * | 8/2004 | ............ F16L 33/227 |
| EP | 0032824 A1 | 7/1981 | |
| EP | 1564473 A1 * | 8/2005 | ............. F16L 33/22 |
| EP | 2860436 A1 * | 4/2015 | ............ F16L 33/227 |
| ES | 2557333 A1 * | 1/2016 | ............ F16L 33/227 |
| FR | 2461874 A1 * | 2/1981 | ............ F16L 33/227 |
| FR | 3114370 A1 * | 3/2022 | ............ F16L 33/227 |
| GB | 2211506 A | 7/1989 | |
| JP | H01206196 A | 8/1989 | |
| KR | 20160031407 A * | 3/2016 | ............ F16L 33/227 |
| KR | 101979303 B1 * | 5/2019 | ............ F16L 33/227 |
| WO | WO-0034092 A2 * | 6/2000 | ............ F16L 33/227 |
| WO | WO-02059521 A1 * | 8/2002 | ............ F16L 33/227 |
| WO | WO-03046429 A1 * | 6/2003 | ............ F16L 33/227 |

OTHER PUBLICATIONS

Hydro-Rain, PVC-Lock Brochure 08685-36 Rev A, publicly available before Jan. 16, 2018 (2 pages).

Hydro-Rain, PVC-Lock Brochure 98606-36 Rev B, publicly available before Jan. 16, 2018 (2 pages).

LASCO Fittings, Inc., LASCO Push Fittings Brochure, Pricing Effective Jul. 1, 2017 (2 pages).

LASCO Fittings, Inc., Pictures of 1-inch IPS Pipe, LPC29-010RMC, publicly available before Jan. 16, 2018 (2 pages).

Picture of Product Labeled "T-Blu", 25×25mm, PN 1.6MPA, publicly available before Jan. 16, 2018 (1 page).

U.S. Appl. No. 17/083,698; Non-Final Rejection mailed Dec. 18, 2024; (pp. 1-12).

* cited by examiner

TUBE COUPLING

FIELD

This disclosure relates to connectors and, in particular, to connectors or couplers for connecting tubing.

BACKGROUND

Semi-flexible tubing is often used in irrigation systems to supply water to irrigation devices or to make drip line. Drip line typically includes a plurality of low flow irrigation devices that are mounted at selected locations along a length of the semi-flexible tubing. The emitters are commonly online (mounted to the outside of the tubing) or inline emitters (mounted to the inside of the tubing). In such irrigation systems, the tubing is connected to a source or supply of water under suitable pressure for flow to each irrigation device positioned at predetermined locations, such as at specific plants or vegetation. To facilitate arrangement of the tubing and associated irrigation devices, tubing connectors or couplings commonly interconnect lengths of the tubing, wherein such couplings may comprise in-line connectors, elbow fittings, tee fittings, and the like.

Many existing tubing connectors are difficult to attach to tubing to connect two lengths of tubing together. For example, some connectors are compression style connectors where the tubing is compressed into the connector. With compression connectors, there is a tight connection between the tubing connector and the tubing so the connector remains attached and forms a fluid tight seal. It is difficult for some installers to adequately grip the connector to properly seat the tube in the connector. Some connector designs use gaskets to form the seal so that the tubing connector is easier to install while forming a fluid tight seal. However, increasing the number of parts used to form the tubing connectors increases the cost of the tubing connector.

DETAILED DESCRIPTION

Figure 1:
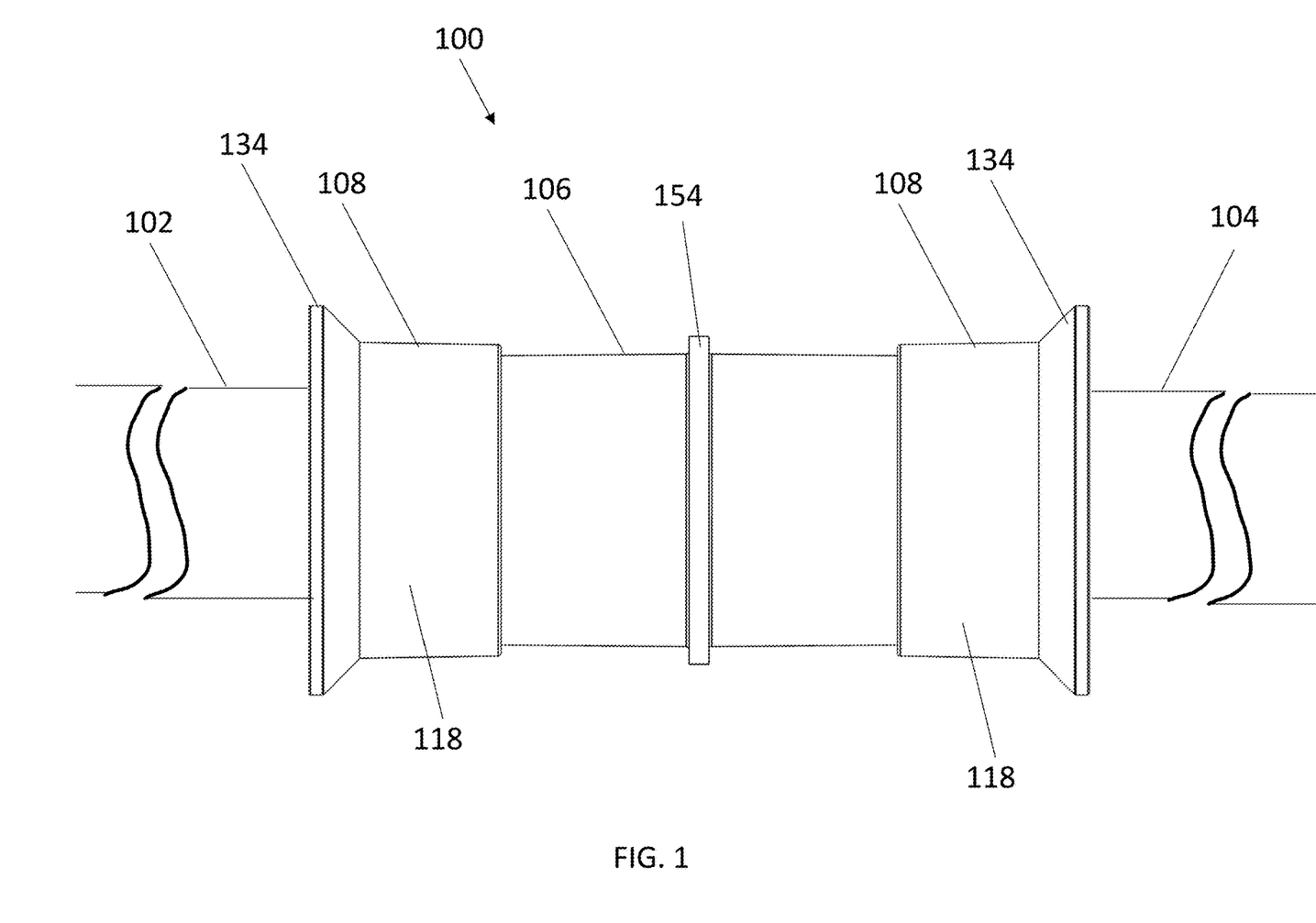
FIG. 1 is a side elevation view of a tube coupling connecting two tubes.

With respect to FIG. 1, a tube coupling 100 is provided connecting ends of a first tube 102 and a second tube 104 in an aligned end-to-end relation. The tubes 102 and 104 may be flexible or semi-flexible tubes that are elastically compressible. For example, the tubes 102, 104 may be formed of a plastic. While the tube coupling 100 shows the tubes 102, 104 aligned with one another, in other forms the tube coupling 100 may be an elbow and connect the tubes at an angle. In yet other forms, the tube coupling 100 may connect more than two tubes together, for example, the tube coupling 100 may be a T-shape for connecting three tubes together.

Figure 2:
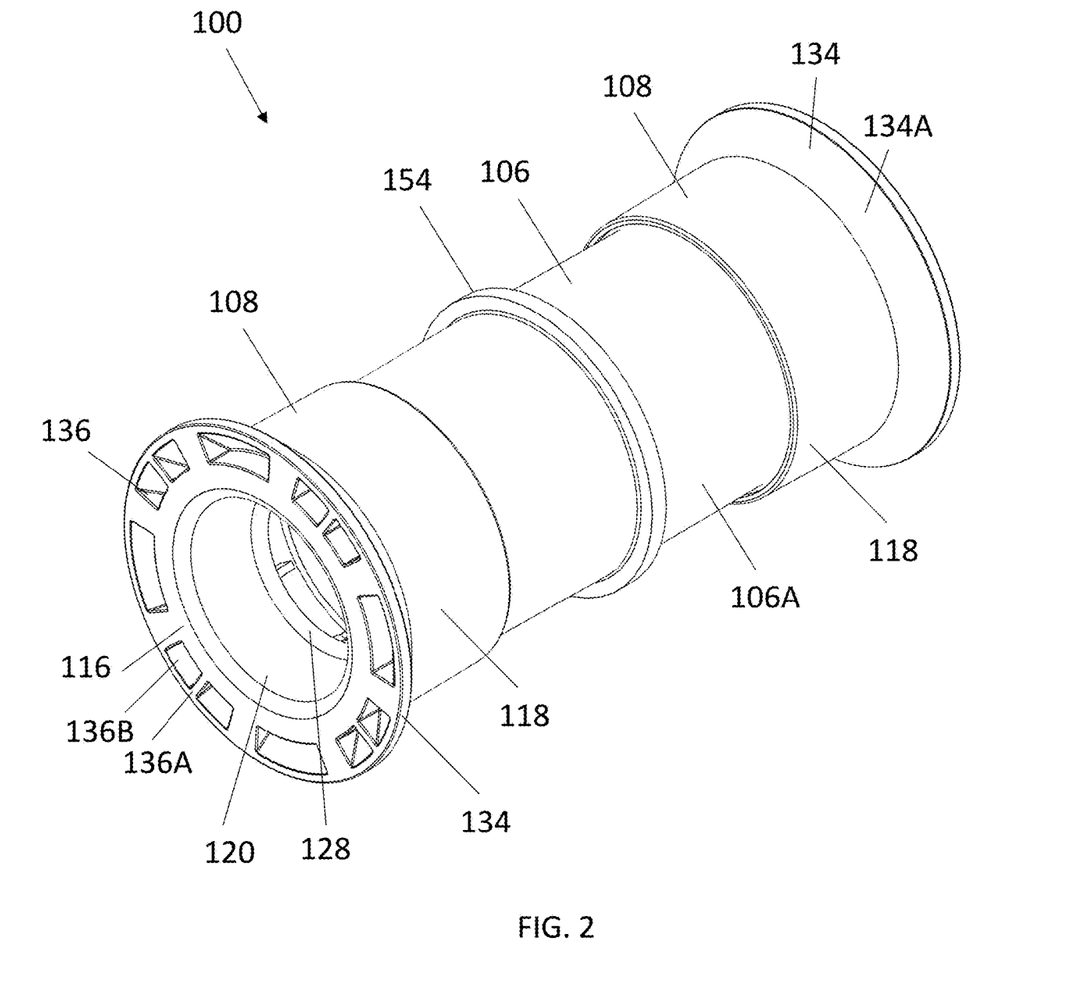
FIG. 2 is a perspective view of the tube coupling of FIG. 1.
Figure 3:
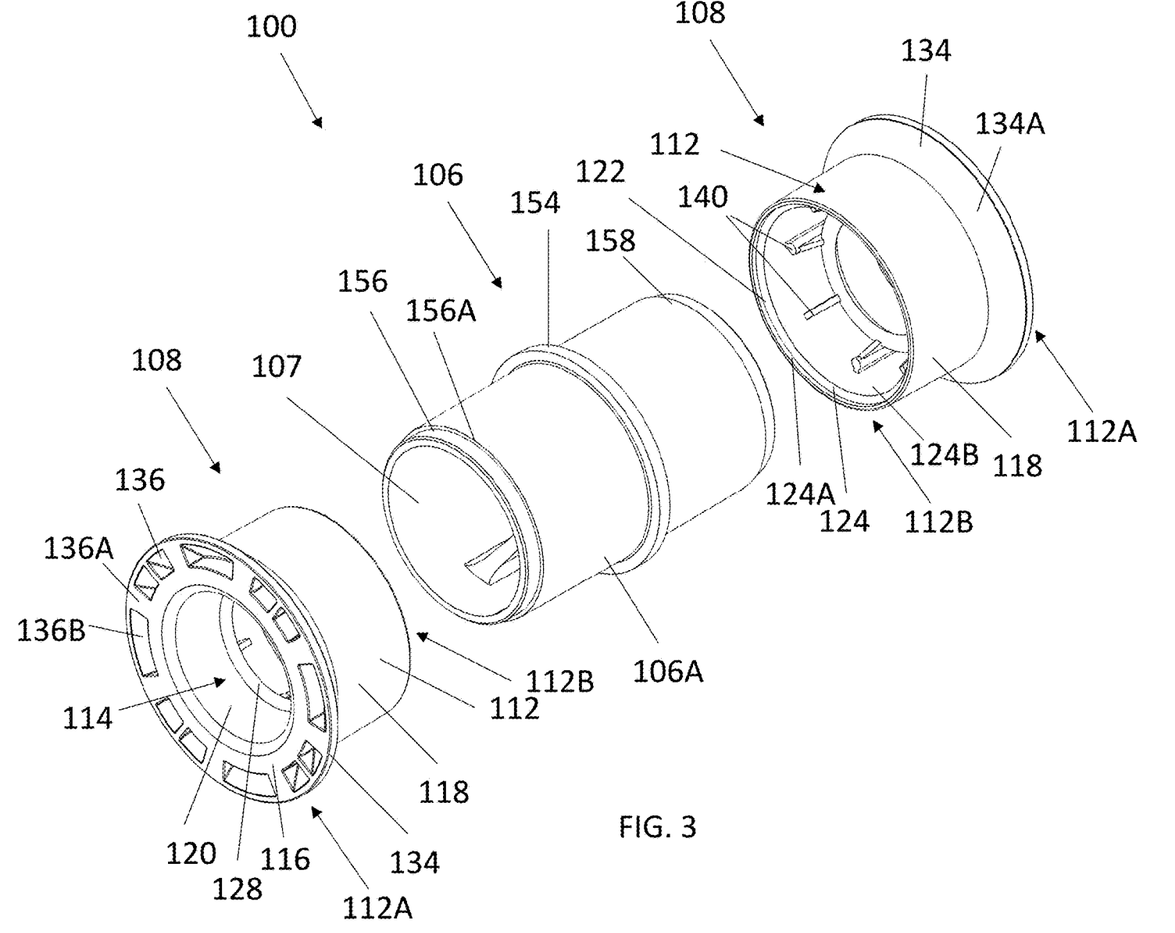
FIG. 3 is an exploded view of the tube coupling of FIG. 1.
Figure 4:
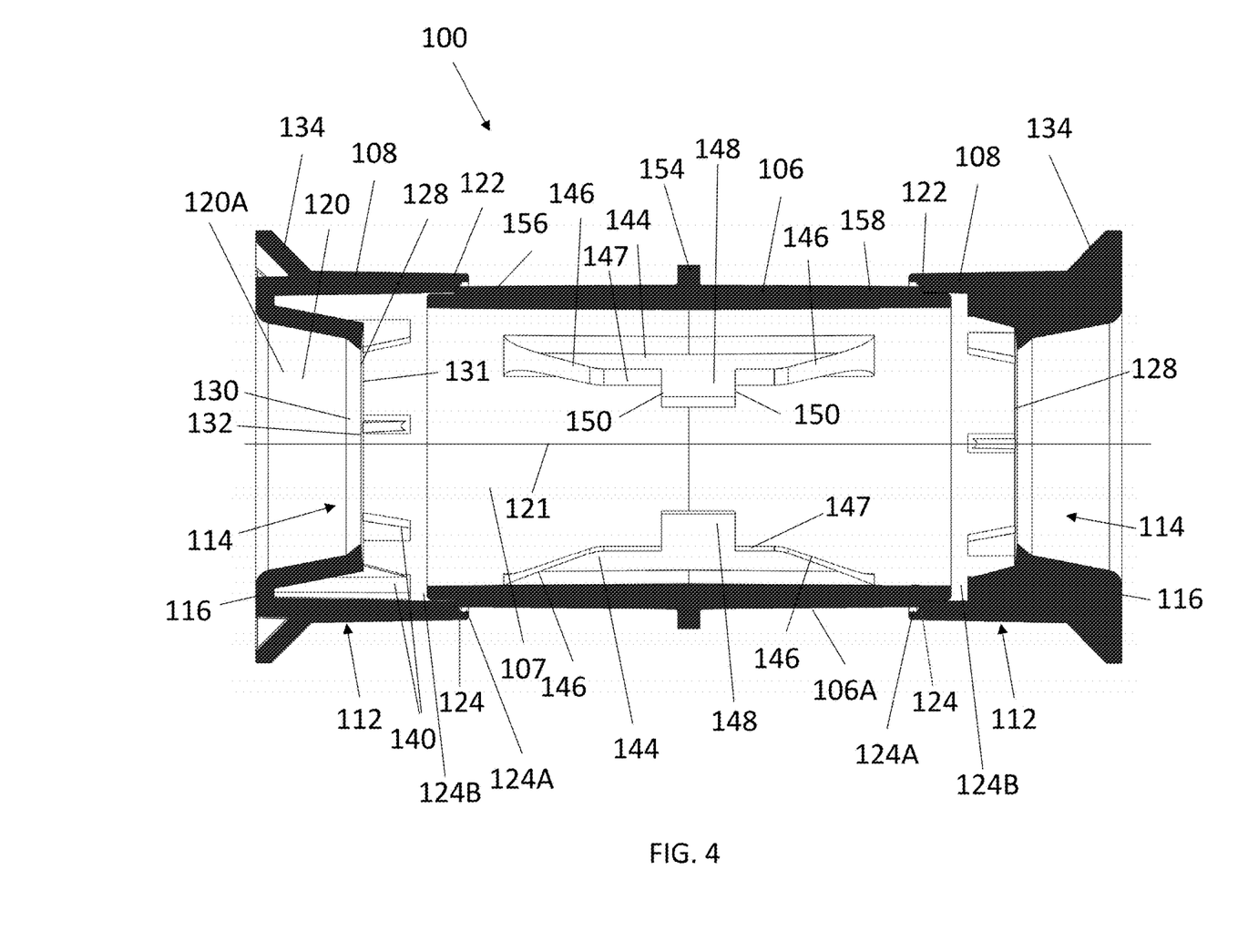
FIG. 4 is a cross-section view of the tube coupling of FIG. 1.
Figure 5:
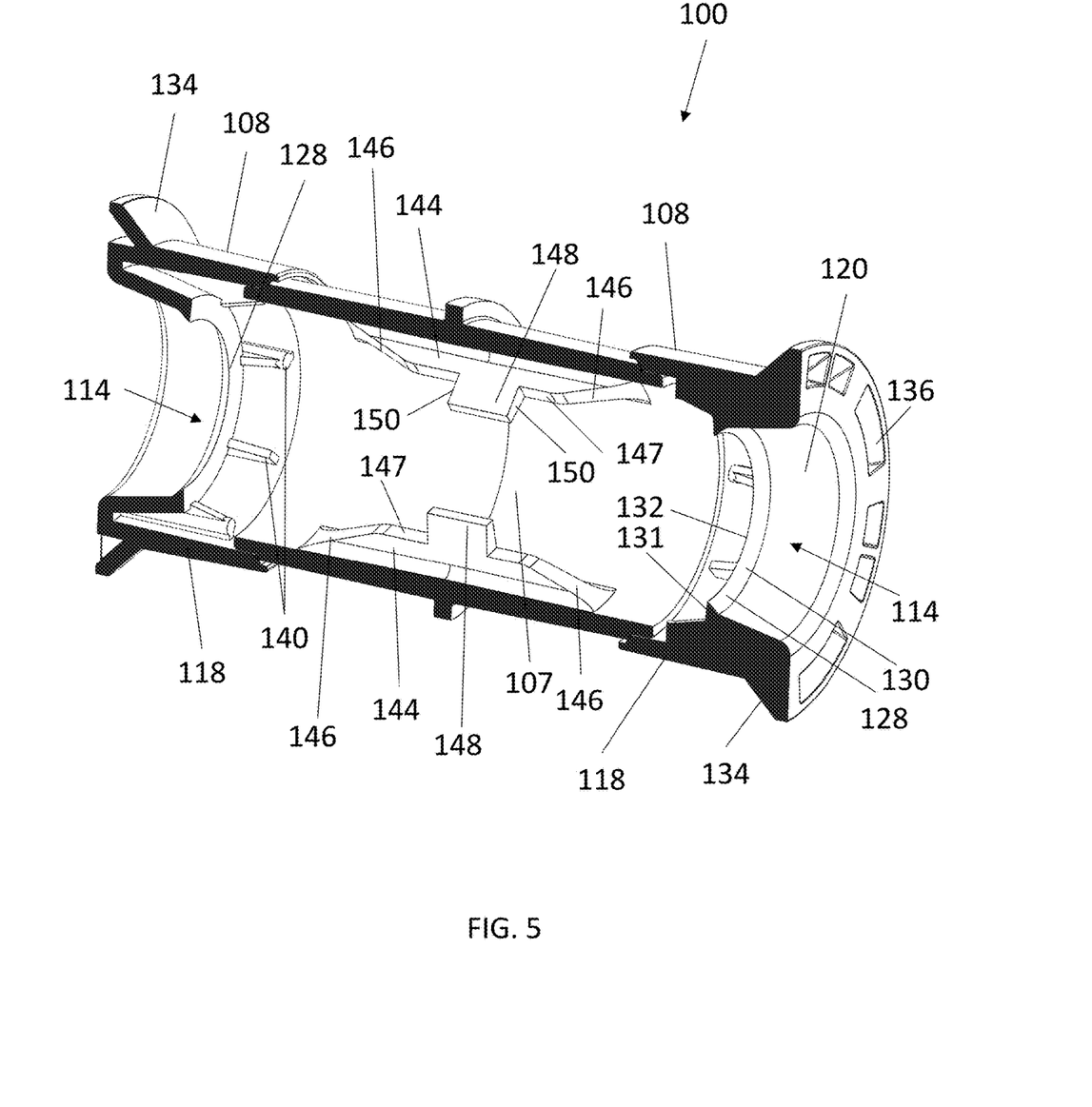
FIG. 5 is a perspective cross-section view of the tube coupling of FIG. 1.
Figure 6:
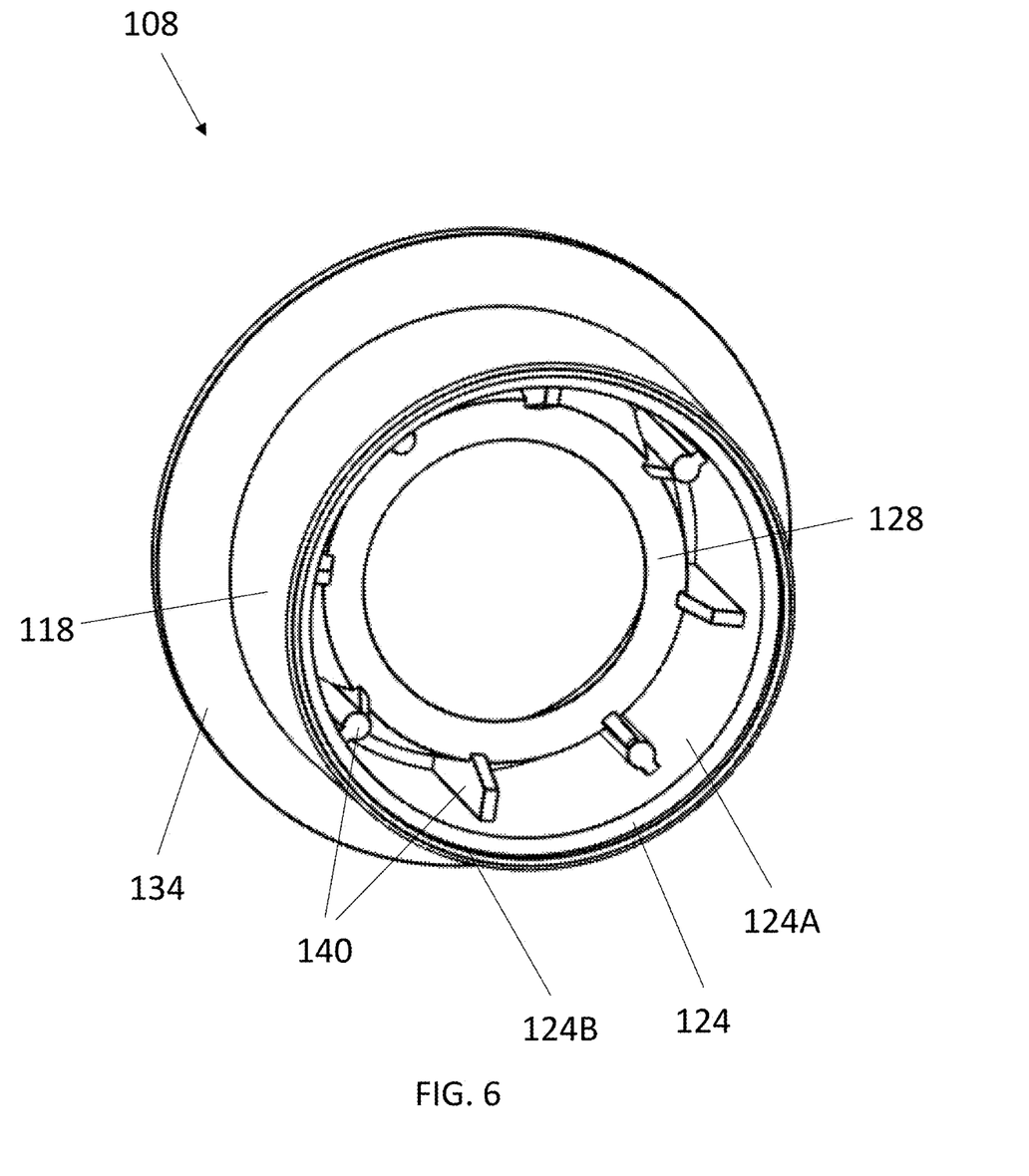
FIG. 6 is a perspective view of a coupler of the tube coupling of FIG. 1.

Regarding FIGS. 1-3, the tube coupling 100 includes a cylindrical body 106 defining a flow path 107 therethrough with couplers 108 mounted on each end of the body 106. The tubes 102 and 104 may be inserted into respective couplers 108 to secure the tubes 102 and 104 to the tube coupling 100 with a fluid tight connection. The couplers 108 also retain the tubes 102 and 104 to inhibit the tubes 102, 104 from being unintentionally withdrawn from the couplers 108. The tube coupling 100 is thus able to fluidly connect and secure the first tube 102 to the second tube 104 without substantial (or any) fluid leakage or separation.

With respect to FIGS. 2-6, the couplers 108 includes an annular body 112 defining a central opening 114 therethrough. The couplers 108 are similar to one another such that discussion of one coupler 108 also applies to the other coupler of the tube coupling 100. The annular body 112 includes an end wall 116, an outer wall 118, and an inner wall 120. The end wall 116 is formed at a first end 112A of the coupler 108.

The outer wall 118 extends axially from the end wall 116 to a second end 112B of the coupler 108. The outer wall 118 may be substantially cylindrical. An end portion 122 of the outer wall 118 at the second end 112B of the coupler 108 attaches to an end portion 156 of the body 106 (see FIG. 4). The end portion 122 of the coupler 108 may be sized to receive the end portion 156 of the body 106. An interior surface of the end portion 122 of the outer wall 118 may include a step 124 (see FIG. 6) between a larger diameter portion 124A and a smaller diameter portion 124B. The step 124 may be chamfered to guide the end portion 156 of the body 106 into the smaller diameter portion 124B of the outer wall 118 when assembled. The end portion 156 of the body 106 includes a step 156A that may abut the step 124 when inserted into the larger diameter portion 124A of the outer wall 118. The end portion 122 of the outer wall 118 may be welded to the body 106 to attach the coupler 108 to the body 106. For example, the coupler 108 may be spin welded to the body 106. For example, once the body 106 is inserted into the end portion 122 of the outer wall 118, the coupler 108 may be rotated relative to the body 106 creating heat via friction sufficient to weld the coupler 108 to the body 106. The weld between the coupler 108 and the body 106 creates a fluid tight connection therebetween. In other forms, an adhesive may be applied to the coupler 108 and/or the body 106 before inserting the body 106 into the coupler 108 to secure the body 106 to the coupler 108. The other end portion 158 of the body 106 may similarly be attached to another coupler 108.

The annular body 112 also includes an annular inner wall 120 that extends about an axis 121 and defines the central opening 114 therethrough along the axis 121. The inner wall 120 extends axially from the end wall 116 toward the second end 112B and is radially inward of the outer wall 118. An inner surface 120A of the inner wall 120 may taper radially inward as the inner wall 120 extends axially toward the second end 112B of the coupler 108. The tapered inner wall 120 guides the tube 102 or 104 into the central opening 114 as the tube is inserted into the annular body 112 to connect the tube 102 to the coupler 108.

The inner wall 120 includes an annular barb 128 that protrudes radially inward from the inner surface 120A of the inner wall 120. The barb 128 may extend continuously about the inner circumference of the inner wall 120. The barb 128 may be sized to compress the tube 102 slightly as the tube 102 is forced beyond the barb 128 with the tube 102 elastically returning toward its original diameter once passed the barb 128. The force of the barb 128 compressing the tube 102 creates a fluid tight seal therebetween. The barb 128 may include a guiding surface 130 and a retaining surface 131 that extend to an annular edge 132 (see FIG. 4). The guiding surface 130 extends at a more gradual angle (e.g., 35 degrees) relative to the axis 121 from the annular edge 132 as opposed to the retaining surface 131 to further guide and compress the tube 102 as it is extended into the coupler 108 and beyond the edge 132 of the barb 128. The retaining surface 131 extends at a steep angle (e.g., 80 degrees) relative to the axis 121 such that the force to withdraw the tube 102 from the coupler 108 is greater than the force required to insert the tube 102 into the coupler 108. Thus, the barb 128 aids to retain the tube 102 within the coupler 108.

The inner wall 120 of the coupler 108 may be sized to receive a tube 102, 104 having a certain diameter. More specifically, the annular edge 132 of the barb 128 may have an inner diameter that is slightly smaller than the outer diameter of the tube 102, 104 to apply a sufficient compressive force to the tube 102, 104 extending through annular edge 132 to form a fluid tight connection with the tube 102, 104. The barb 128 of the coupler 108 may apply a compressive force on the tube 102, 104 such that the coupler 108 maintains a fluid tight connection with the tube 102, 104 up to, for example, 150 psi. The tube coupling 100 may include couplers 108 having a larger inner diameter at the annular edge 132 to accommodate larger diameter tubing. Similarly, the tube coupling 100 may include couplers 108 having a smaller diameter at the annular edge to accommodate smaller diameter tubing. As an example, the annular edge 132 may have a 0.625 inch diameter for a tube 102, 104 having a 0.700 inch outer diameter. As another example, the annular edge 132 may have a 0.640 inch diameter for a tube 102, 104 having a 0.710 inch outer diameter.

The coupler 108 includes a flange 134 that protrudes radially outward from the outer wall 118 at the first end 112A of the coupler 108. The flange 134 is annular and extends about the circumference of the coupler 108. The flange 134 provides an engagement surface 134A against which a user can apply force in the direction of the axis 121 when inserting the tube 102, 104 into the coupler 108. For example, the user may grasp the outer wall 118 of the coupler 108 with their hand such that their thumb and index finger contact the engagement surface 134A of the flange 134. The user may grasp the tube 102, 104 with their other hand and force the tube 102, 104 axially into the central opening 114 of the coupler 108 and beyond the barb 128 by moving the coupler 108 and the tube 102, 104 toward one another along the axis 121. The flange 134 is beneficial because it permits the user to apply a force directly in the axial direction rather than having to do that with merely a radial grip that can allow slippage when inserting a tube. That is, the flange 134 inhibits the user's hand from slipping along the outer wall 118 of the coupler 108 as the coupler 108 and tube 102, 104 are urged toward one another. The flange 134 may extend radially outward from the outer wall 118 in the range of about 2 mm to about 15 mm to provide the engagement surface 134A with sufficient surface area to press against. In some embodiments, the flange 134 is a partially annular and/or may be comprised of multiple distinct radially extending protrusions separated by gaps.

The engagement surface 134A of the flange 134 may be tapered and extend at an angle relative to the outer wall 118 such that the engagement surface 134A extends axially as the flange 134 extends radially from the outer wall 118. A web or matrix 136 may extend between the outer wall 118 and the engagement surface 134A to support the engagement surface 134A while reducing the material required to form and support the flange 134. The matrix 136 includes struts 136A that extend from the annular body 112 to the radially outer edge of the flange 134 with pockets 136B formed between the struts 136A. The struts 136A may extend radially from the annular body 112 to the radially outer edge of the flange 134. The pockets 136B may extend annularly about the flange 134 between the struts 136A.

The coupler 108 may include one or more supports 140 between the outer wall 118 and the inner wall 120. The supports 140 may increase the rigidity of the outer wall 118 and inner wall 120 to inhibit the outer wall 118 and/or inner wall 120 from flexing substantially. The supports 140 may aid to resist deformation or compression of the outer wall 118, for instance, when a user grips the outer wall 118 to attach the tube 102, 104. The supports 140 may aid to maintain the position of the inner wall 120 and the barb 128 as the tube 102, 104 is inserted therein, for example, resisting radially outward deflection of the barb 128 as the tube 102, 104 is inserted therethrough.

The central body 106 includes an outer wall 106A defining the flow path 107. The body 106 may be cylindrical having a substantially cylindrical inner surface that defines the flow path 107. In other forms, the central body 106 may have other shapes for connecting two or more tubes at an angle relative to one another. For example, the central body 106 may include a bend such that the body 106 forms an elbow (e.g., L or V-shaped). As another example, the central body may define a T-shaped flow path and be connected to three couplers at each end of the flow path for connecting three tubes together. The central body 106 may include any number of configurations for connecting two or more tubes together.

The central body 106 includes a plurality of elongated axially extending guide ramps 144 that extend into the flow path 107. In the embodiment shown, the body 106 includes three guide ramps 144 which may be at approximate equiangular intervals about the flow path interior. The guide ramps 144 center and retain the ends of the tubes 102, 104 press-fitted into the couplers 108 of the tube coupling 100 in substantial axial alignment. Each guide ramp 144 has ramped ends 146 that taper radially inwardly to an axially extending portion 147 that include a centrally positioned stop or tab 148. The tab 148 projects radially inward to define a short step with axially opposed shoulders 150 extending generally perpendicular to a central axis of the body 106. The ramped ends 146 of the guide ramps 144 direct the end portion of the tube 102, 104 toward the center of the body 106 as the tube 102, 104 is inserted into the body 106. The axially extending portion 147 of the guide ramps 144 center the end of the tube 102, 104 and align the end of the tube 102, 104 to extend substantially parallel to the axis of the body 106. When the tubes 102, 104 are received into the opposite ends of the body 106 and pressed along the guide ramps 144 and against the tabs 148, the tubes 102 104 are substantially axially aligned and in fluid communication with one another such that fluid flows from one of the tubes 102, 104 along the flow path 107 to the other of the tubes 102, 104. The tabs 148 provide a positive end stop or backstop structure against which the tubes 102, 104 are pressed against when fully inserted into the tube coupling 100. The tabs 148 may provide a user with tactile feedback indicating the tube 102, 104 has been fully inserted when the user feels the tube 102 contact the tab 148. The body 106 may further include an external rib 154 for engagement by tooling to support the body 106 when the couplers 108 are attached to the body 106, for example, by spin welding the couplers 108 to the body 106. The external rib may encompass the body 106 and may provide enhanced gripping for the user during installation of tubes.

In use, an end portion of the tube 102 may be brought in proximity to the coupler 108 of the tube coupling 100. The tube 102 may be advanced axially into the inner wall 120 of the coupler 108. Force may be applied to urge the tube 102 through the central opening 114 of the coupler 108, beyond the barb 128 of the coupler 108, and along the guide ramps 144 until the tube 102 contacts the tab 148. For example, a user may grasp the end portion of the tube 102 with one hand and grasp the outer wall 118 of the coupler 108 with their other hand. The user may force the tube 102 through the central opening 114 of the coupler 108 by applying an axial force on the tube 102 and the flange 134 of the coupler 108 to move the tube 102 and coupler 108 toward one another. The second tube 104 may similarly be attached to the other coupler 108 of the tube coupling 100 to mechanically secure and fluidly connect the first tube 102 to the second tube 104 via the tube coupling 100.

Figure 7:
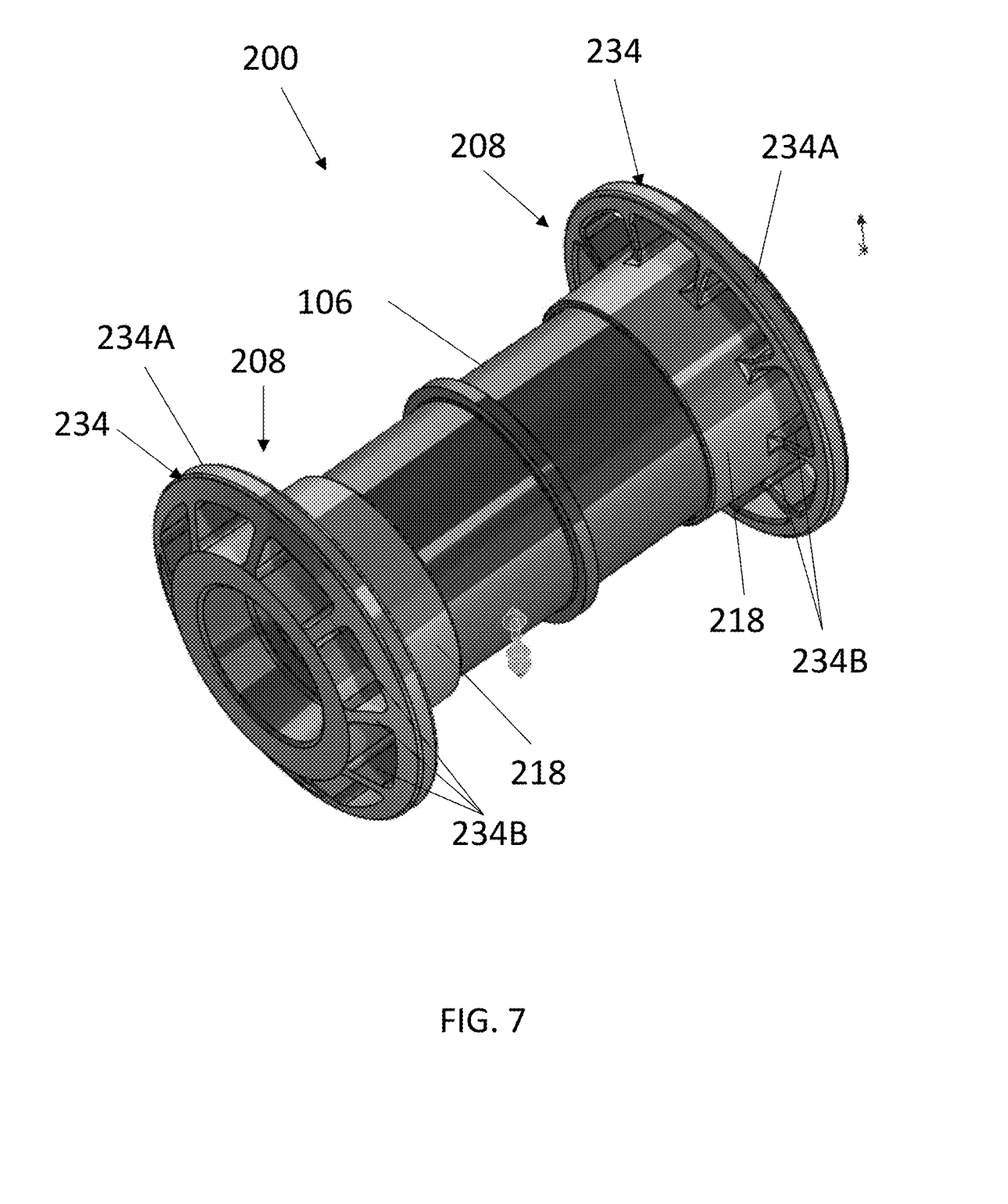
FIG. 7 is a perspective view of a tube coupling according to another embodiment.
Figure 8:
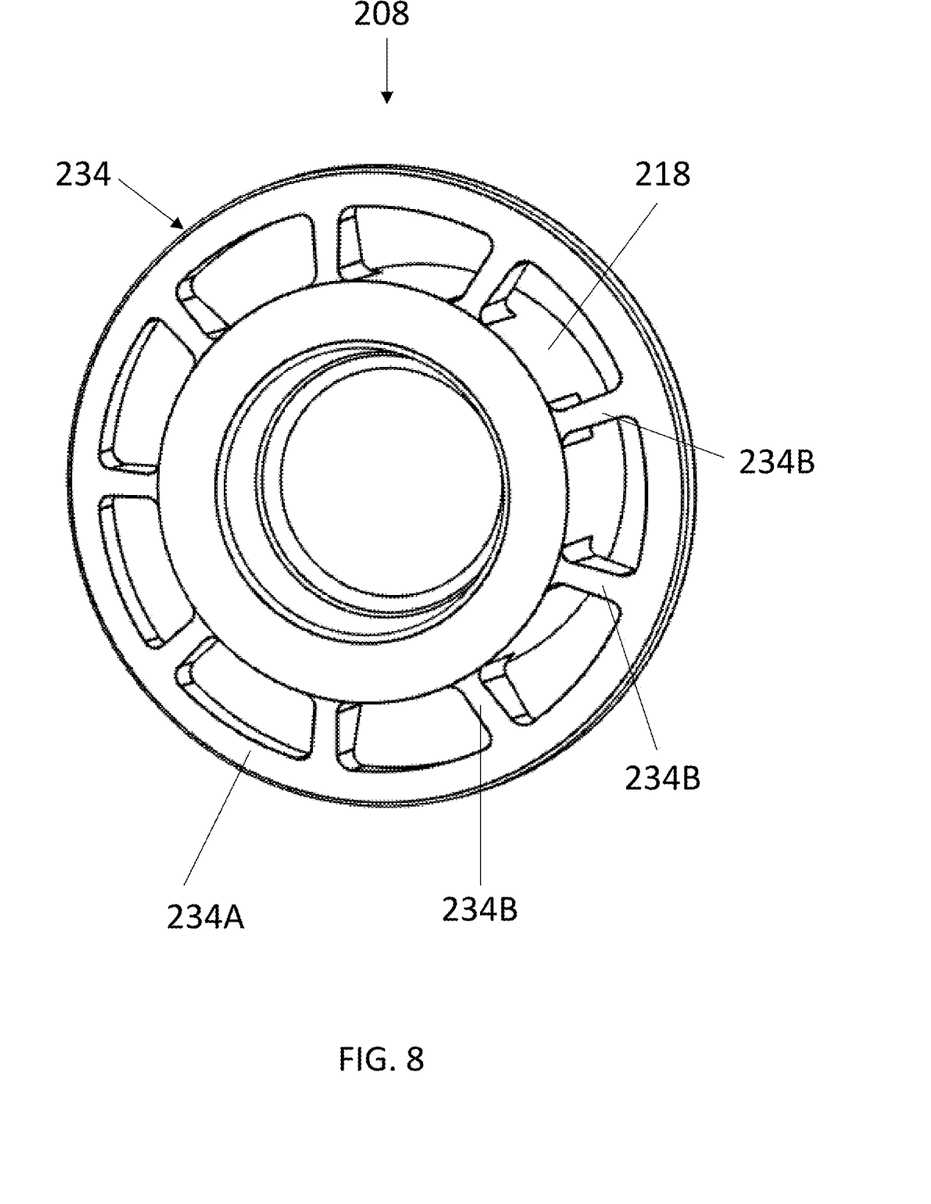
FIG. 8 is a perspective view of a coupler of the tube coupling of FIG. 7.

With reference to FIGS. 7-8, a tube coupling 200 is shown according to another embodiment. The tube coupling 200 is like the tube coupling 100 discussed above such that only the differences will be highlighted. Tube coupling 200 includes the central body 106 and couplers 208 attached at opposite ends of the central body 106. The couplers 208 are like the couplers 108 discussed above with the primary difference being the flange 234 extending radially outward from an outer wall 218 of the coupler 208. The flange 234 includes an outer ring 234A and a plurality of supports or spokes 234B extending radially outward from the outer wall 218 to the ring 234A. In use, a user may grasp the outer wall 218 of the coupler 208 with their hand (e.g., thumb and index finger) and apply a force against the ring 234A and/or spokes 234B of the flange 234 in the axial direction to force a tube into the coupler 208.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A tube connector comprising:
    a body defining a fluid flow path therethrough; and
    a coupler having an annular body including an outer wall and an inner surface, an end of the outer wall mounted on the body at one end of the flow path, the inner surface supported by the outer wall and defining a central opening for receiving an end portion of a tube,
    the coupler including a barb protruding radially inward from the inner surface to engage the end portion of the tube to secure the tube to the coupler, and
    the coupler including a protrusion extending radially outward from the outer wall beyond a maximum outer dimension of the outer wall,
    wherein the annular body includes the outer wall and an inner wall having the inner surface, and the inner wall and the outer wall are concentric.

2. The tube connector of claim 1 wherein the protrusion extends about the outer wall.

3. The tube connector of claim 1 wherein the protrusion includes an engaging surface that extends radially and axially from the outer wall.

4. The tube connector of claim 1 wherein the inner surface tapers radially inward as the inner surface extends axially toward the end of the outer wall mounted on the body.

5. The tube connector of claim 1 wherein the inner surface is annular.

6. The tube connector of claim 1 wherein the barb includes a first surface and a second surface, an angle of the first surface relative to an axis defined by the inner surface being less than an angle of the second surface relative to the axis.

7. The tube connector of claim 1 wherein the barb extends about the inner surface.

8. The tube connector of claim 1 wherein the end of the outer wall is welded to the body.

9. The tube connector of claim 1 further comprising a second coupler having a second annular body including an outer wall and an inner surface, an end of the outer wall of the second coupler mounted on the body at another end of the flow path.

10. The tube connector of claim 1 wherein the coupler includes a support matrix for the protrusion.

11. The tube connector of claim 1 wherein the protrusion has an engagement surface sized for a user's hand to apply force to urge the end portion of the tube into the central opening.

12. A tube connector comprising:
    a body defining a fluid flow path therethrough; and
    a coupler having an annular body including an outer wall and an inner surface, an end of the outer wall mounted on the body at one end of the flow path, the inner surface supported by the outer wall and defining a central opening for receiving an end portion of a tube,
    the coupler including a barb protruding radially inward from the inner surface to engage the end portion of the tube to secure the tube to the coupler, and
    the coupler including a protrusion extending radially outward from the outer wall,
    wherein the annular body includes the outer wall and an inner wall having the inner surface, and the inner wall and the outer wall are concentric; and
    one or more support ribs between the outer wall and the inner wall.

13. A tube connector comprising:
    a body defining a fluid flow path therethrough; and
    a coupler having an annular body including an outer wall and an inner surface, an end of the outer wall mounted on the body at one end of the flow path, the inner surface supported by the outer wall and defining a central opening for receiving an end portion of a tube,
    the coupler including a barb protruding radially inward from the inner surface to engage the end portion of the tube to secure the tube to the coupler, and
    the coupler including a protrusion extending radially outward from the outer wall, wherein the coupler includes a support matrix for the protrusion, wherein the support matrix includes struts and pockets.

14. The tube connector of claim 13 wherein the struts are radial and the pockets are annular.

15. A tube connector comprising:

a body defining a fluid flow path therethrough; and a coupler having an annular body including an outer wall and an inner surface, an end of the outer wall mounted on the body at one end of the flow path, the inner surface supported by the outer wall and defining a central opening for receiving an end portion of a tube, the coupler including a barb protruding radially inward from the inner surface to engage the end portion of the tube to secure the tube to the coupler, and the coupler including a protrusion extending radially outward from the outer wall beyond a maximum outer dimension of the outer wall, wherein the barb and the annular body of the coupler are a single piece.

16. The tube connector of claim 15 wherein the protrusion extends about the outer wall, the protrusion having an engagement surface sized for a user's hand to apply force to urge the end portion of the tube into the central opening.

17. The tube connector of claim 15 wherein the protrusion includes an engagement surface that extends radially and axially from the outer wall.

18. The tube connector of claim 15 wherein the inner surface tapers radially inward as the inner surface extends axially toward the end of the outer wall mounted on the body.

19. The tube connector of claim 15 wherein the inner surface is annular.

20. The tube connector of claim 15 wherein the barb includes a first surface and a second surface, an angle of the first surface relative to an axis defined by the inner surface being less than an angle of the second surface relative to the axis.

21. The tube connector of claim 15 wherein the end of the outer wall is welded to the body.

22. The tube connector of claim 15 further comprising a second coupler having a second annular body including an outer wall and an inner surface, an end of the outer wall of the second coupler mounted on the body at another end of the flow path.

* * * * *